(12) United States Patent
Walker et al.

(10) Patent No.: US 6,470,130 B1
(45) Date of Patent: Oct. 22, 2002

(54) WAVEGUIDE STRUCTURES

(75) Inventors: James A. Walker, Howell; Howard R. Stuart, Red Bank, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/495,126

(22) Filed: Feb. 1, 2000

(51) Int. Cl.$^7$ .................................................. G02B 6/00
(52) U.S. Cl. ....................................... 385/142; 385/144
(58) Field of Search ................................. 385/141–145

(56) References Cited

U.S. PATENT DOCUMENTS

| | | | |
|---|---|---|---|
| 5,394,239 A | * | 2/1995 | Valette |
| 5,488,678 A | * | 1/1996 | Taneya et al. |
| 5,604,835 A | * | 2/1997 | Nakamura et al. |
| 5,394,801 A | * | 2/1998 | Boysel |

OTHER PUBLICATIONS

Porte, Henri, et al. "Imbalanced Mach–Zehnder Interferometer Integrated in Micromachined Silicon Substrate for Pressure Sensor", Journal of Lightwave Technology, vol. 17, No. 2, Feb. 1999, pp. 229–233.

Henry, C.H., et al. "Low Loss $Si_3N_4$–$SiO_2$ Optical Waveguides on Si", Applied Optics, Jul. 1, 1987, vol. 26, No. 13, pp. 2621–2624.

Haronian, D., "Suspended Optical Waveguide with In–Plane Degree of Freedom for Microelectromechanical Applications", Electronic Letters, Apr. 2, 1998, pp. 663–665, Abstract Only.

Chollet, F., M. de Labachelerie, and H. Fujital, Conference Title: "Proceedings MEMS 98.IEEE. Eleventh Annual International Workshop on Micro Electro Mechanical Systems. An Investigation of Micro Structures, Sensors, Actuators, Machines and Systems", IEEE, New York, NY USA CY: Jan. 25–29, 1998, pp. 476–481, Abstract Only.

Eng, T.T.H., S.C. Kan, and G.K.L. Wong, "Surface–Micromachined Epitaxial Silicon Cantilevers as Movable Optical Waveguides on Silicon–on–Insulator Substrates", Sensors and Actuators A (Physical), Jun. 1995, pp. 109–113, Abstract Only.

* cited by examiner

Primary Examiner—Hung N. Ngo

(57) ABSTRACT

A waveguide for optical transmission having a mechanically active core material comprised of a silicon-rich silicon nitride in a mechanically active region. In the mechanically active region, the silicon-rich silicon nitride core can have no cladding (ie. an air cladding) or a cladding comprised of a silicon nitride over at least a portion thereof. The silicon-rich silicon nitride core is comprised of a silicon nitride compound having a ratio of silicon to nitrogen atoms greater than that of stoichiometric silicon nitride, $Si_3N_4$.

14 Claims, 3 Drawing Sheets

MEASURED RELATIONSHIP OF STRESS AND REFRACTIVE INDEX

MEASURED RELATIONSHIP OF STRESS AND REFRACTIVE INDEX

WAVEGUIDE STRUCTURES

FIELD OF THE INVENTION

The present invention relates to waveguides for optical transmission.

BACKGROUND OF THE INVENTION

Optical waveguides are generally known to provide a path for optical transmission.

Mechanically active waveguides or waveguide regions make use of movement of the transmission to create devices such as routers, evanescent switches, attenuators and the like.

Surface waveguides are typically formed using multiple silicon dioxide film layers. First, a film of low refractive index silicon dioxide is deposited on a silicon substrate to form a lower cladding layer. A second film of higher index silicon oxide is deposited on the lower cladding and then patterned to form the core region. Finally, another film of lower index silicon oxide is conformingly deposited over the core to surround the core region completely with cladding material.

However, this process creates silicon dioxide film layers that are inherently under compressive stress. This residual compressive stress leads to unstable mechanical behavior such as buckling if the waveguide is not rigidly supported by a cladding and/or substrate. This is especially true when a mechanically active waveguide is being formed and the released region exceeds a few microns in length.

SUMMARY OF THE INVENTION

Deficiencies of the prior art are overcome by the present invention which is directed to a waveguide comprising a mechanically active silicon-rich silicon nitride core in a micromechanical region. In such a waveguide the use of a silicon-rich silicon nitride core having an air cladding or a silicon-rich silicon nitride cladding in the mechanically active region is preferred.

"Silicon-rich" silicon nitride compounds are defined as silicon nitrides having a ratio of greater than 3 silicon atoms to 4 nitrogen atoms per molecule. For example, silicon nitride compounds having the formula $Si_3N_4$ are considered stoichiometric. Silicon nitride compounds with higher silicon content are considered silicon-rich silicon nitrides.

Significantly, it has been determined herein that as the silicon content in the silicon nitrides increases, the index of refraction of the film increases and the tensile stress in the film used for the waveguide decreases. These films can be used to create membrane based micromechanical waveguide structures having a mechanically active silicon-rich silicon nitride core in the micromechanical, or movable region. The silicon-rich silicon nitride can be mechanically moved without compromising the mechanical features, unlike known waveguides using silicon oxide films which are known to have significant compressive stress.

The reduced tensile stress films of the present invention allow for the manufacture of a wide range of mechanically active waveguides which expand the possible applications of waveguides in optical transmissions.

BRIEF DESCRIPTION OF THE DRAWINGS

The attached drawings, in which like reference characters represent like parts, are provided solely to illustrate the present invention without limiting the invention in any manner whatsoever.

DETAILED DESCRIPTION OF THE PREFERRED EMBODIMENT

It has been discovered herein that silicon-rich silicon nitride can be used to form low residual tensile stress films for creating mechanically active micromechanical (MEMS) devices. The use of "silicon-rich" silicon nitride for membrane based MEMS devices has great benefit to the development of a MEMS based wavelength division multiplexing equalizer, as discussed in U.S. Pat. No. 5,943,158, due to the ability to form low residual tensile stress films.

Changing the silicon content of silicon nitride, by changing the gas flow parameters and temperature during deposition, results in a silicon nitride film having a residual stress which can be continuously varied from as high as 1 GPa tensile through zero and even slightly compressive. In forming silicon-rich silicon nitride films for use in MEMS waveguides, it is preferred that the tensile stress of the film be in the range of about 0 to about 500 megapascals with a range of about 250 megapascals being most preferred.

Figure 1:
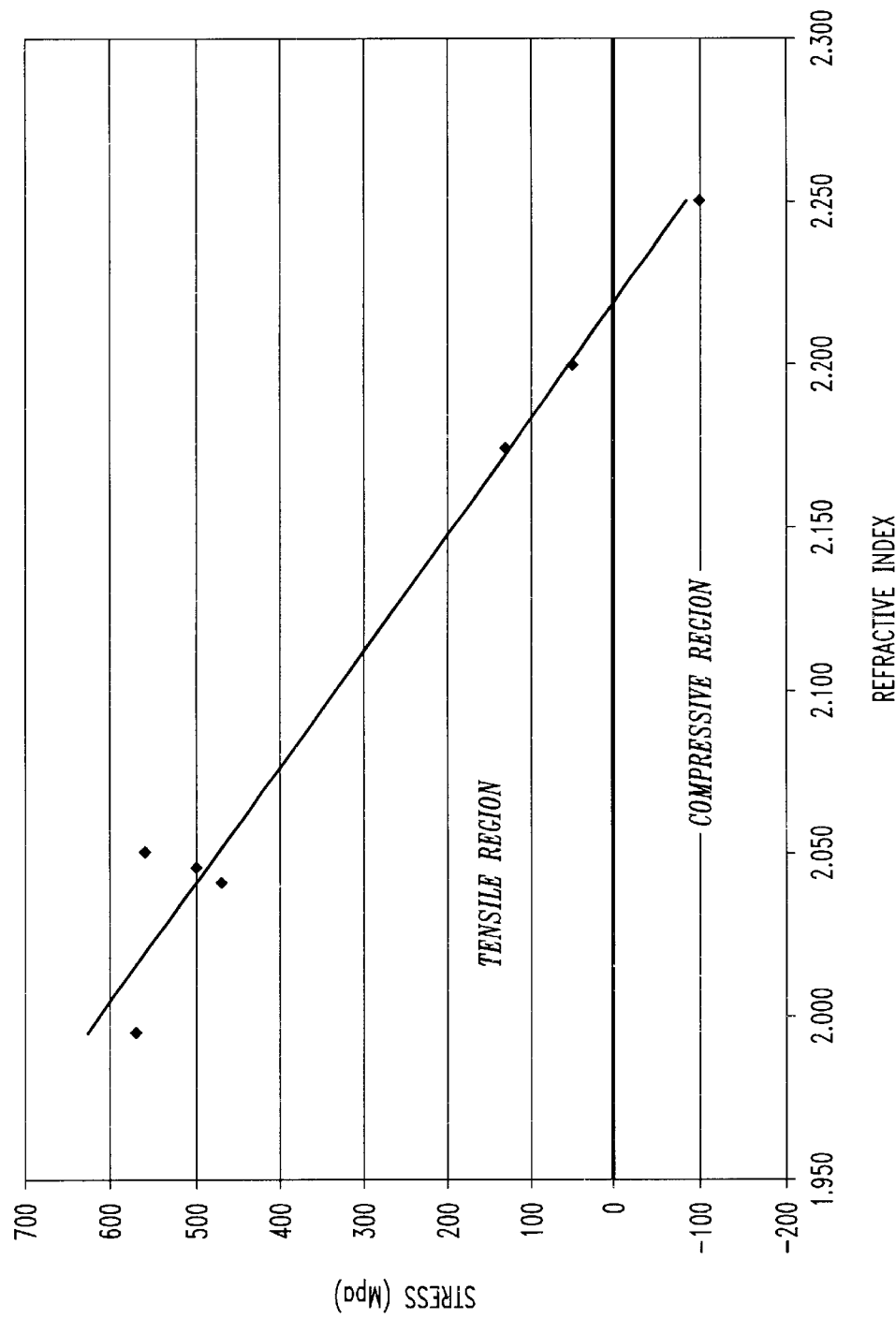
FIG. 1 is a graph of the measured relationship between stress and refractive index for various silicon nitride films deposited in the same reactor.

As the gas parameters are changed, the index of refraction is affected as well. A plot of stress versus index of refraction for a range of silicon nitride films with increased silicon content is shown in FIG. 1. The exact relation of stress to refractive index will vary for different deposition systems, however, the general trend shown in FIG. 1 is representative.

By taking advantage of the index changes that can be induced while still maintaining tensile stress in the silicon-rich silicon nitride films, waveguides are developed based on the silicon-rich silicon nitride, thus avoiding the stress problems associated with silicon dioxide based systems. Mechanically active waveguides are formed with silicon-rich silicon nitride films released from the substrate in mechanically active or movable regions. These regions can be physically manipulated to cause optical effects such as micro-bending losses to form micromechanical devices such as attenuators, routers or evanescent couplings for selectively switching between the two waveguides.

The present invention makes use of the active mechanical region 8 of a waveguide 2 having a silicon-rich silicon nitride core 10. The silicon-rich silicon nitride core 10 can have an air cladding 16 (or no cladding) in the mechanically active region 8 to facilitate movement of the silicon-rich silicon nitride core 10 in the mechanical region 8.

Alternatively, if a cladding is desired in the mechanical region 8, a silicon nitride cladding 12 along at least a portion thereof is preferred. In its preferred cladded embodiment, the silicon nitride cladding 12 is also formed of a silicon-rich silicon nitride having a refractive index less than or equal to that of the silicon nitride core 10. In this regard, it has been discovered that a change in the refractive index can be achieved by varying the silicon content of the silicon nitride from the core 10 to the cladding 12.

Efficiency of coupling to optical fibers or other waveguides will play a large role in determining exact geometry of the mechanically active waveguides.

The design of waveguides 2 in micromechanical systems will depend upon numerous factors. First, a generic waveguide 2 will consist of three basic regions: the interface region 4, the transfer region 5, and the micromechanical region 8. The interface regions 4 are located at the edges of the device, where the device interfaces with the outside world, which is assumed to consist of some type of optical fiber 6. The transfer region 5 serves to connect the interface region to the micromechanical region 8. The design constraints in the interface region 4, however, may conflict with those in the micromechanical region 8. If needed, the transfer region 5 can also serve to adiabatically alter the dimensions of the waveguide 2 to help reconcile these constraints.

In the micromechanical region 8 the availability of slab layers of material generally comprising a core 10 and a cladding 12 or 16 with tunable refractive indices in the range of 2.0–2.2 allowing for a range of potential waveguide designs. A waveguide 2 can be fabricated by depositing several planar layers of material with varying refractive indices on a substrate 14 and etching the sample to form the general structure shown in FIG. 2. For these designs, we assume that the refractive indices are $n_f \geq n_{s1} > n_{s2}$ in the basic ridge waveguide structure. When $n_f = n_{s1}$, it is referred to as a rib waveguide, and when $n_{s1} = n_{s2}$, it is referred to as a raised strip waveguide. Note that ridge and rib guides are preferred over raised strip guides because of their increased tolerance to width variations and surface roughness.

The most basic fabrication technique for waveguides 2 would consist of a series of depositions of the bottom cladding 12a on the substrate 14 and the core material 10 over the bottom cladding 12a followed by a subsequent patterning and etching step to define the lateral structure of the waveguide and to release the micromechanical region 8 and provide an upper cladding of air ($n_c = 1$). The ability to do further depositions following the etch process would allow greater flexibility in design. For example, $n_c$ could be specified to be a higher index and additional layers could be added to the upper cladding 12b. The general deposition techniques for manufacturing waveguides applies to the present invention with variations based upon the desired silicon content of the silicon nitride being sought.

The design of the waveguide 2 in the interface region 4 will be constrained by issues relating to the input and output coupling of the light. If the interface is with a single mode fiber 6, the ridge waveguide is preferred to be single mode. For a butt-coupling geometry, it is important to match the modal profile of the ridge waveguide 2 to that of the single mode fiber, i.e. a circularly symmetric mode with an effective width of approximately 8 microns. This implies that the dimensions W and $h_f + h_{s1}$ must be on the order of ~8 microns in size for efficient coupling.

For ridge and rib guide designs, single mode propagation is obtained for these dimensions as long as $h_{s1}$ is made sufficiently large to support guided modes in this layer away from the film layer ($h_f$, $n_f$). For example, if we take $n_{s2} = 2.0$, $n_{s1} = n_f = 2.1$, $n_c = 1$, and $h_f = h_{s1} = 4$ microns, the resulting waveguide will be single mode provided W<7.9 microns. In this case, the term "single mode" is meant to imply a single mode of each polarization, transverse electric (TM) and transverse magnetic (TM). Because of the asymmetric nature of the design, the TE and TM modes will have slightly different propagation behavior, resulting in a polarization dependence of the fiber to device coupling.

In the micromechanical region 8, constraints imposed by the mechanical properties of the materials may necessitate material layers which may be much thinner than those described above (~5 microns or less in thickness). A major challenge in the device design is to reconcile this constraint with the mode-coupling. This can be done by adiabatic tapering, by using a lensed fiber coupling, or by finding an appropriate waveguide design that arrives at an acceptable compromise in all regions.

Figure 2:
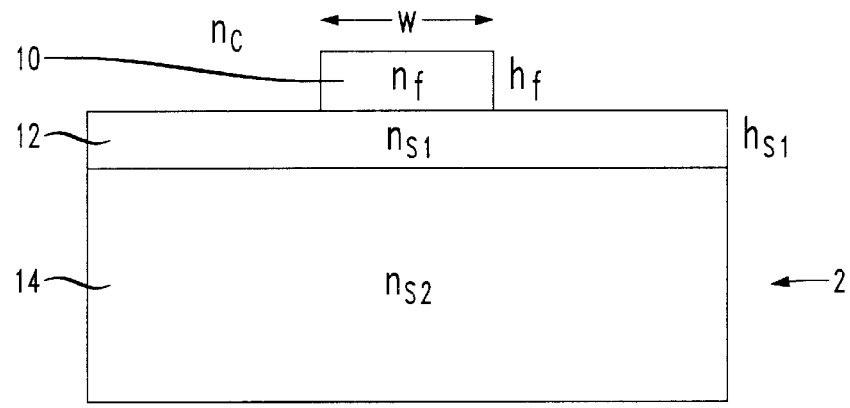
FIG. 2 is a cross sectional front elevation of a ridge waveguide structure formed according to the invention of the present invention wherein "h" represents thickness, "n" represents refractive index and "w" represents width.

Note that, in the micromechanical region 8, not all of the layers pictured in FIG. 2 will necessarily be present. For example, the bottom cladding layer 12 may consist of phosphosilicate glass (PSG) in the interface region which would be removed in the micromechanical region 8 to form an air region 16 or air cladding 16. The upper cladding 12 might be absent or removed, or perhaps reduced in dimension as compared to the interface region 4. The specific design of the waveguide 2 in the micromechanical region 8 will depend upon the particular application. In a variable attenuator shown in FIG. 3, a waveguide 2 that is particularly sensitive to bends is desired. By contrast, in an evanescent cross-connect application, a waveguide 2 that is not lossy under bending conditions is preferred, with modes of that waveguide 2 extend into the air region 16 (see FIG. 4).

Figure 3:
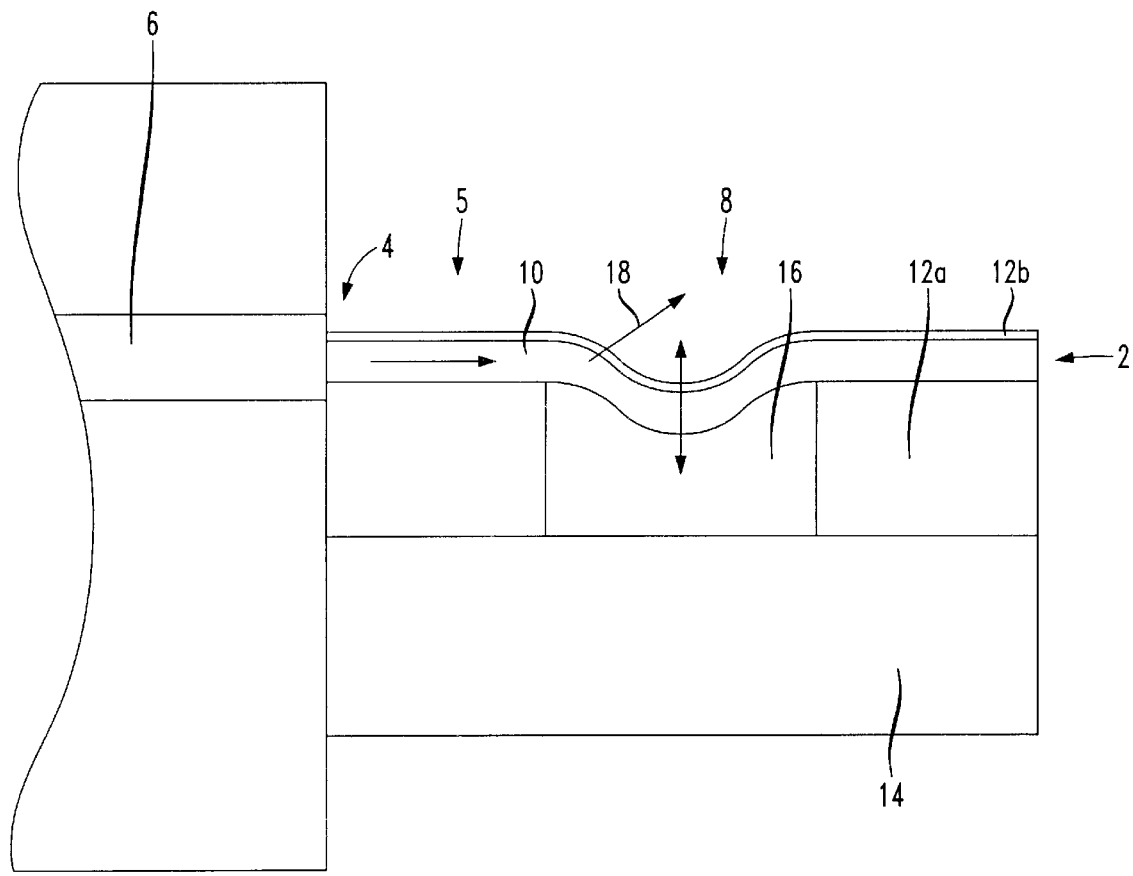
FIG. 3 is a cross sectional side elevation of a variable attenuator device utilizing the teaching of the present invention.

The variable attenuator shown in FIG. 3 provides that the silicon-rich silicon nitride core 10 having a silicon nitride upper cladding 12b the silicon-rich core can be moved in a vertical direction to vary the loss 18 during bending conditions. In this FIGURE, the area above the upper cladding 12b and below the silicon-rich silicon nitride core 10 in the mechanically active region 8 is air 16.

Figure 4:
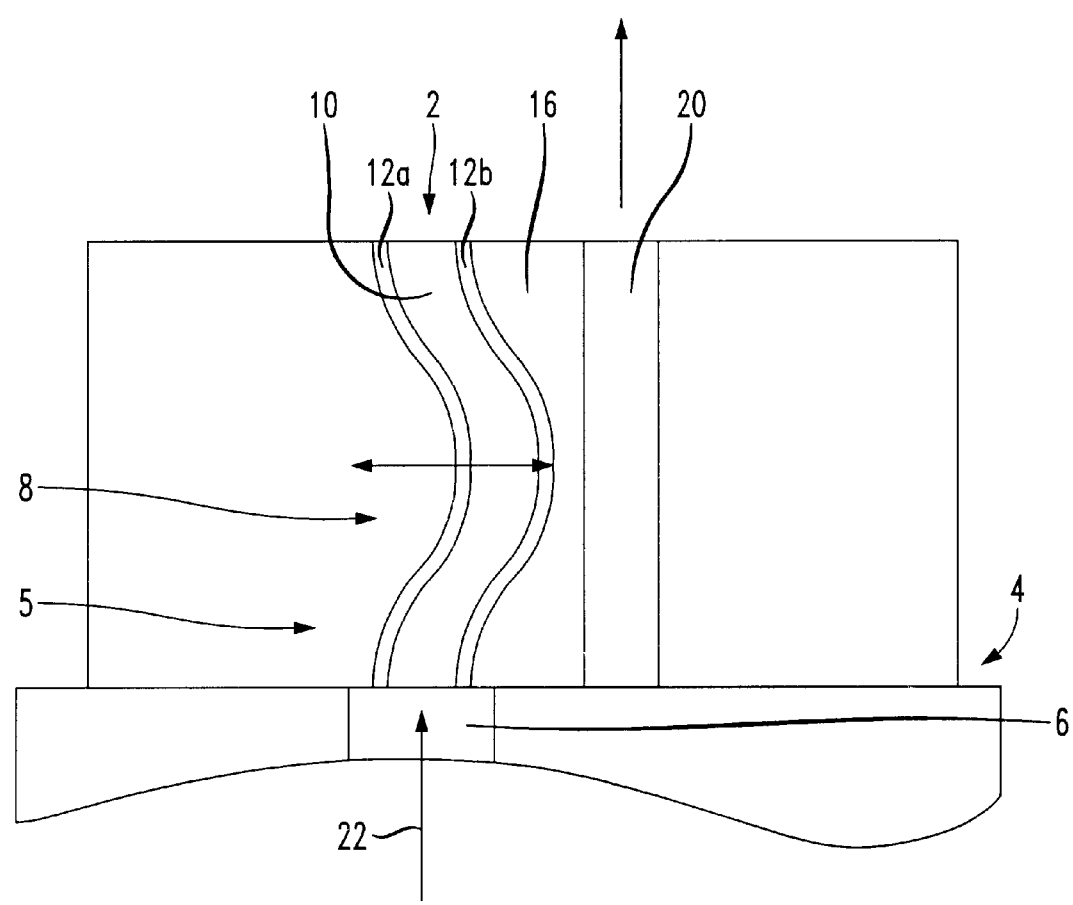
FIG. 4 is a plan view of an evanescent cross-coupler incorporating two waveguides.

Similarly, the evanescent cross-coupler shown in FIG. 4 includes a first waveguide 2 formed of a silicon-rich silicon nitride core 10 and a silicon nitride cladding 12 adjacent a second waveguide 20 (which may or may not be formed of the silicon nitride core and cladding of the present invention). In this case the optical transmission path 22 enters the silicon-rich silicon nitride core 10 which is subject to horizontal motion. When the core 10 is straight there is no loss, effectively leaving the switch off. When the core 10 is bent, as shown in FIG. 4, the loss travels to the adjacent core 20 and the switch is on.

Given the wide range of potential designs, it is useful to simply examine the minimum film thickness required to propagate a mode in these types of structures, where maximums are controlled mainly by the physical constraints of the material. In a symmetrical design ($n_c = n_{s1} = n_{s2}$) there is no cutoff, and the film layers can be made as thin as is desired, with a minimum thickness of about 0.10 microns being preferred. In such a structure, symmetry would have to be maintained throughout the entire device to ensure the no cutoff condition. This would preclude any sort of adiabatic tapering in the vertical dimension.

A sharp interface would exist between the transfer region 5 and the micromechanical region 8, where portions of the lower and upper claddings 12a and 12b would change from, i.e. PSG, silicon nitride or silicon dioxide to air. This may or may not be desirable, or even practical. In the more likely circumstance, one might have PSG as the removable lower cladding ($n_{s2} = 1.6$) and an upper cladding 12b that consists of a thin layer of silicon nitride topped by air, preferably with a minimum thickness of about 0.02 microns, or just air cladding 16 without a silicon nitride cladding 12. Within the micromechanical region 8, the PSG layer would be removed, and there would be a series of thin silicon nitride cladding layers 12 surrounded by air.

For illustration, we consider a three-layer planar waveguide that consists of a core layer 10 with index 2.0–2.2, cladded on top by air 16 and on bottom by a silicon nitride layer 12a with an index of 1.6. For this case, the cutoff thicknesses (assuming a wavelength of 1.55 microns) are 0.17 microns when $n_f$=2.0 and 0.12 microns when $n_f$=2.2. The approximate minimum thicknesses required for the silicon nitride core 10 in the transfer region 5 in order to propagate a mode is about 0.10 microns. The maximum thickness is similarly limited mainly by the mechanical constraints of the silicon nitride core 10. The specific design of the ridge structure (i.e. the height and width of the ridge, and the composition of the various sub-layers of silicon nitride) will depend upon the particular application and the need to reconcile the various design constraints.

Notwithstanding, it is the use of a mechanically active silicon-rich silicon nitride core 10 in the mechanical region 8, with or without a cladding 12 of silicon nitride along at least a portion thereof without compromising the integrity of the waveguide 2 which allows for a variety of micromechanical devices.

Variations and modifications to the designs described herein will make themselves apparent to one skilled in the art in light of the foregoing description without deviating from the spirit and scope of the present invention. All such variations and modifications are intended to fall within the subject invention, limited solely by the appended claims. All patents and publications mentioned herein are hereby incorporated by reference.

What is claimed is:

1. A waveguide comprising a mechanically active silicon-rich silicon nitride core in a mechanical region wherein the silicon rich silicon nitride core composition comprises a silicon nitride molecule having a silicon content greater than stoichiometric silicon nitride.

2. The waveguide of claim 1 wherein the mechanically active silicon-rich silicon nitride core has a cladding in the mechanically active region taken from the group consisting of air and a silicon nitride compound.

3. The waveguide of claim 1 wherein the silicon-rich silicon nitride core has a refractive index of from about 2.0 to about 2.2.

4. The waveguide of claim 3 wherein the mechanically active silicon-rich silicon nitride core has a thickness of not less than about 0.10 microns in the mechanical region.

5. The waveguide of claim 2 wherein the cladding is formed of a silicon nitride compound having a thickness of not less than about 0.02 microns.

6. The waveguide of claim 2 wherein the cladding is formed of a silicon-rich silicon nitride compound.

7. The waveguide of claim 1 wherein the waveguide comprises a mechanically active device taken from the group consisting of an attenuator, an evanescent cross-coupling switch and a router.

8. The waveguide of claim 1 wherein the silicon-rich silicon nitride core is formed of a silicon nitride film having a tensile stress from about 0 to about 500 megapascals.

9. The waveguide of claim 8 wherein the silicon-rich silicon nitride core is formed of a silicon nitride film having a tensile stress of from about 0 to about 250 megapascals.

10. The waveguide of claim 1 wherein at least a portion of the silicon-rich silicon nitride core in the mechanically active region has an air cladding to facilitate micromechanical movement of the core.

11. The waveguide of claim 1 wherein the silicon-rich silicon nitride core has a silicon nitride cladding and the silicon nitride cladding has an air cladding in the mechanical region.

12. A waveguide comprising a mechanically active core consisting of a silicon-rich silicon nitride composition in a mechanical region wherein the silicon nitride composition comprises a silicon nitride having a silicon content greater than stoichiometric silicon nitride.

13. The waveguide of claim 12 wherein the silicon-rich silicon nitride core has a silicon nitride cladding over at least portion of the mechanical region.

14. The waveguide of claim 12 wherein the silicon-rich silicon nitride core has an air cladding over at least port ion of the mechanical region.

* * * * *